US006783379B2

(12) United States Patent
Kerscher et al.

(10) Patent No.: US 6,783,379 B2
(45) Date of Patent: Aug. 31, 2004

(54) CONNECTOR, A FLUID LINE AND A FLUID POWER INSTRUMENTALITY

(75) Inventors: Wolf-Dieter Kerscher, Kirchheim (DE); Hans-Walter Brenner, Stuttgart (DE); Klaus Zoller, Stuttgart (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/302,505

(22) Filed: Nov. 21, 2002

(65) Prior Publication Data

US 2003/0100209 A1 May 29, 2003

(30) Foreign Application Priority Data

Nov. 28, 2001 (EP) ............................................. 01710059

(51) Int. Cl.$^7$ ............................................... H01R 4/60
(52) U.S. Cl. ..................................................... 439/191
(58) Field of Search ............................... 439/191, 190, 439/192, 194

(56) References Cited

U.S. PATENT DOCUMENTS 2,178,931 A * 11/1939 Crites et al. ................. 439/191

3,879,097 A * 4/1975 Oertle ....................... 340/855.1
5,658,159 A * 8/1997 Gardner et al. .............. 439/294
5,967,816 A * 10/1999 Sampa et al. ................ 439/190
6,511,335 B1 * 1/2003 Rayssiguier et al. ......... 439/191

FOREIGN PATENT DOCUMENTS

GB       2056611 A      3/1981
JP       08270845       10/1996

* cited by examiner

Primary Examiner—Tulsidas C. Patel
(74) Attorney, Agent, or Firm—Hoffmann & Baron, LLP

(57) ABSTRACT

A connector for a fluid line defines therein a fluid duct and whose wall has at least one signal conductor for the transmission of electrical and/or optical signals. The connector comprises a plug socket for the fluid line, a holding device for holding the fluid line in the mounted condition thereof and at least one signal switch contact for producing a connection with the at least one signal conductor. The at the plug socket the fluid line is provided with a guide means for angularly aligned arrangement of the fluid line, such guide means being able to be introduced into the at least one fluid duct and in the case of such introduction it slides along at least one angular encoding means arranged in the at least one fluid duct so that the fluid duct is able to be brought into a predetermined angular position prior to contact being made between the at least one signal switch contact and the at least one signal conductor.

26 Claims, 8 Drawing Sheets

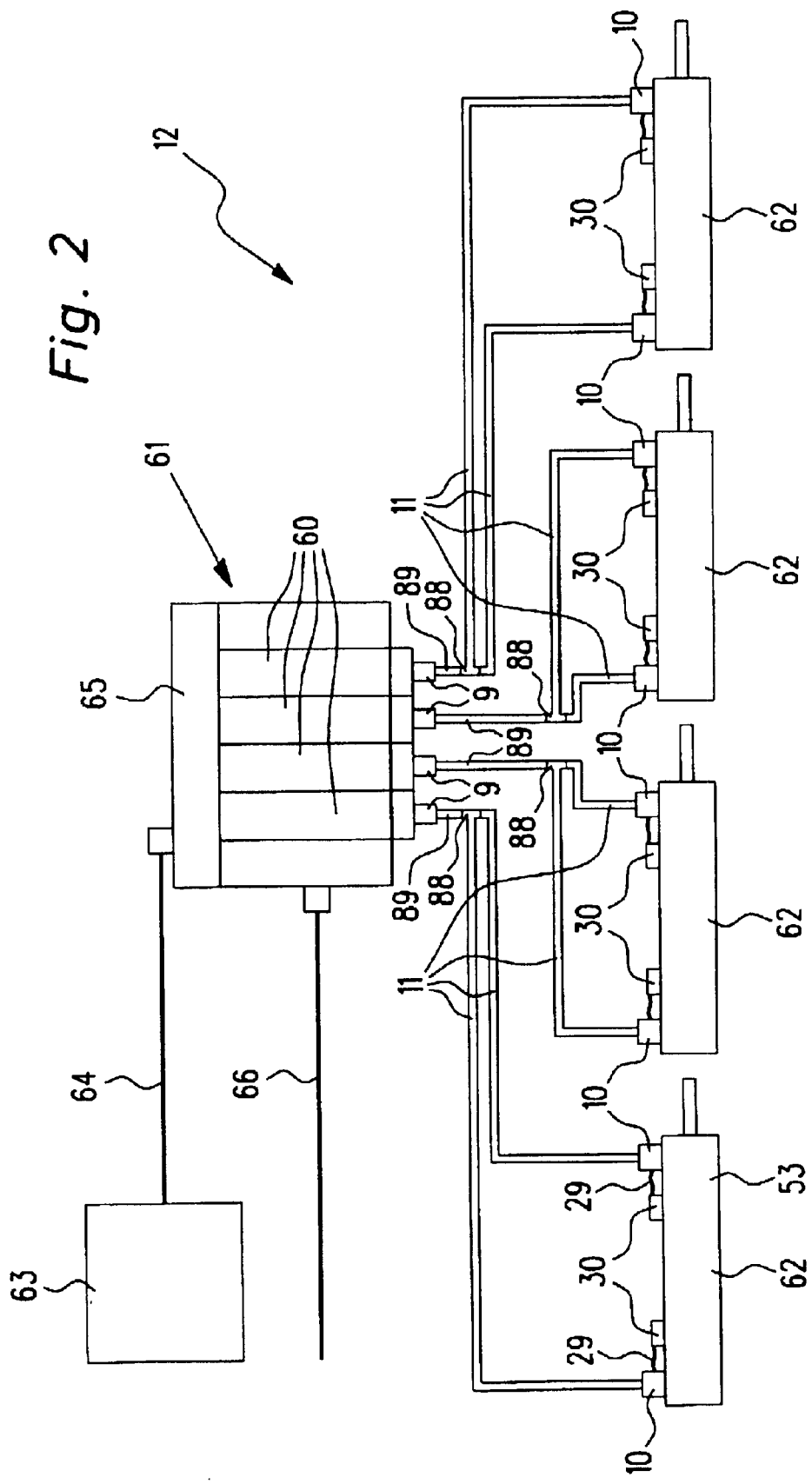

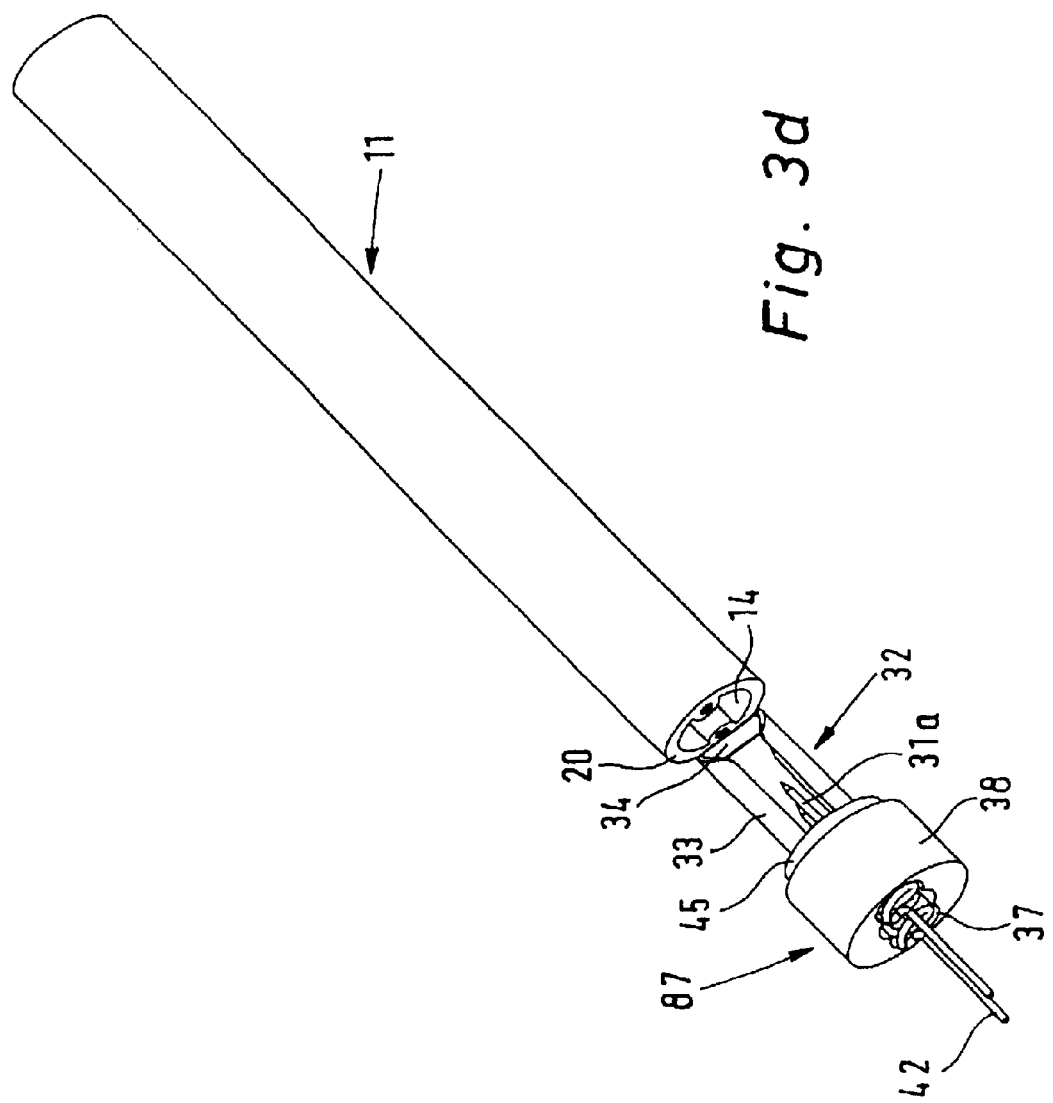

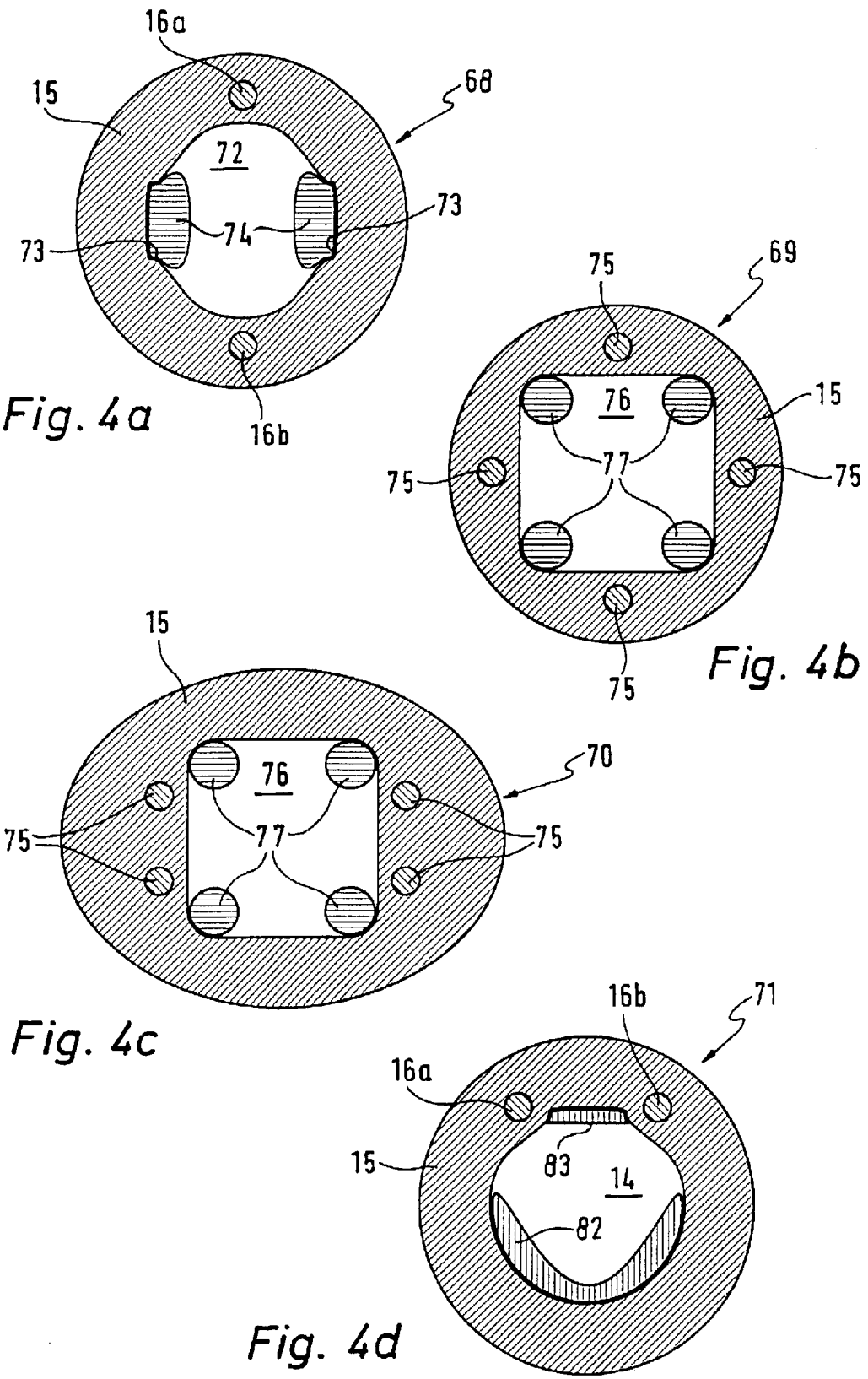

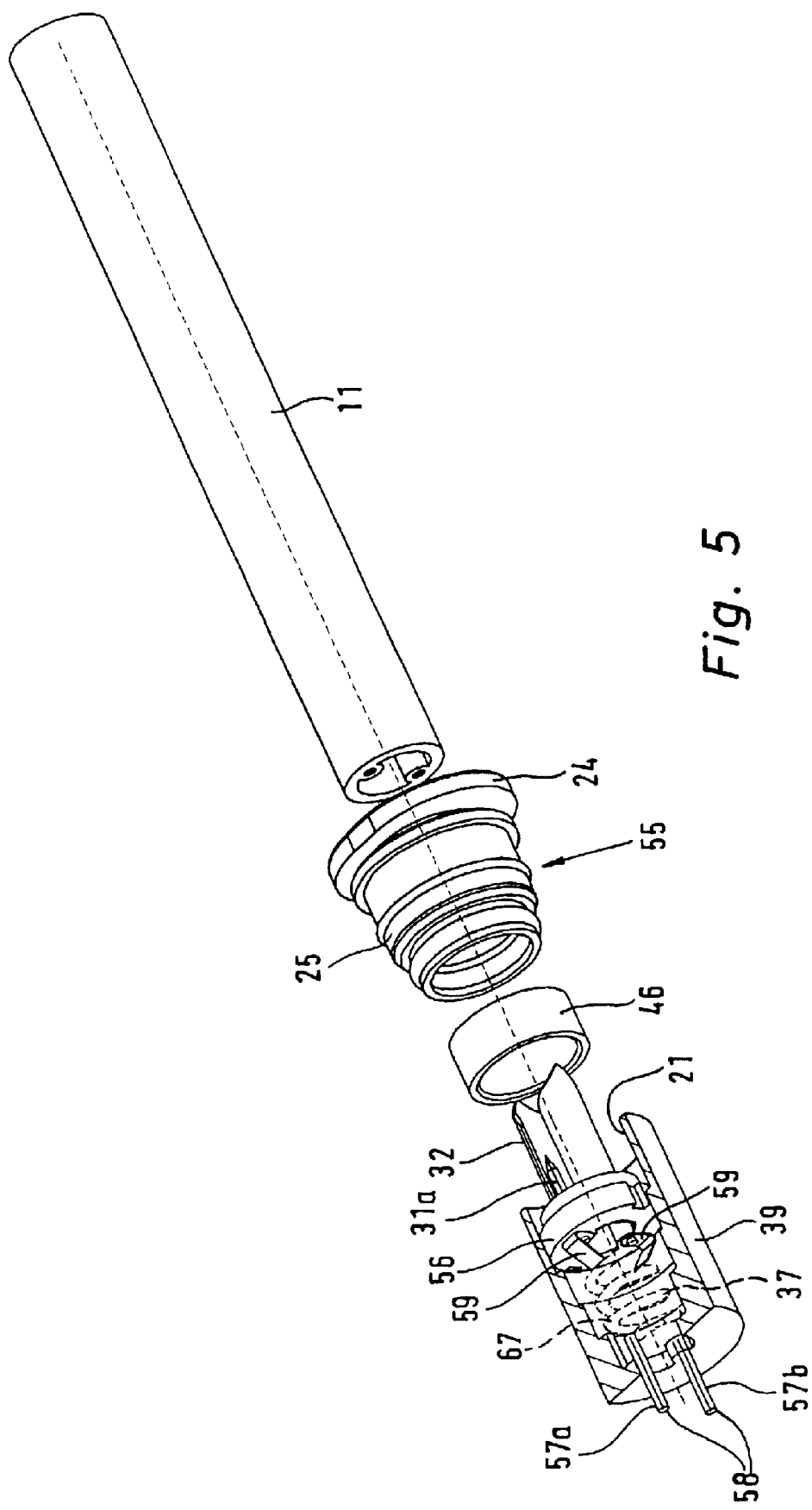

CONNECTOR, A FLUID LINE AND A FLUID POWER INSTRUMENTALITY

BACKGROUND OF THE INVENTION

The invention relates to a connector for a fluid line delimiting a fluid duct therein, the wall of said fluid line having at least one signal conductor for the transmission of electrical and/or optical signals, said connector comprising a plug socket for the fluid line, a holding device for holding the fluid line in the mounted condition thereof and at least one signal switch contact for producing a connection with the at least one signal conductor.

Furthermore, the invention relates to a fluid line for use with such a connector, comprising a wall surrounding a fluid duct, which wall has at least one signal conductor for the transmission of electrical and/or optical signals and a fluid power means, as for example a valve arrangement, a servicing device, with such a connector or, respectively, such a fluid line.

THE PRIOR ART

The Japanese patent publication P-H8-270845 for instance discloses a fluid line having two electrical conductors arranged in the wall thereof. The fluid line is able to be plugged into a connector. At the position of connection conductors project out of the fluid line and join with signal switch contacts of the connector to form electrical contact connections. The connector or, respectively, the fluid line is arranged on a fluid power means.

By way of the fluid line it is possible to conduct both fluid pressure medium and also control signals and/or information to and from a fluid power means. However, the known connector is inconvenient to handle, something which has to do with the connection system adopted: a pressure-tight connection must be produced the connector or, respectively, fluid power means and the fluid line. Furthermore, the signal conductors must be connected with signal switch contacts of the connector or, respectively, the fluid power means.

In this respect the signal switch contact or contacts on the connector must be positioned in relation to the at least one signal conductor. This however makes it more difficult for the user to plug in the fluid line correctly into the connector. The result of this may be contact problems and consequent faulty functioning or even damage due to reversal of connections.

SHORT SUMMARY OF THE INVENTION

Accordingly one object of the present invention is to provide a connector, a fluid line and, respectively, fluid power means of the initially described type in the case of which the correlation of the at least one signal conductor and the at least one signal switch contact is improved.

In order to achieve these and/or other objects appearing from the present specification, claims and drawings, in the present invention a connector of the type initially mentioned is provided such that at the plug socket the fluid line is provided with a guide means for angularly aligned arrangement of the fluid line, such guide means being able to be introduced into the at least one fluid duct and in the case of such introduction it slides along at least one angular encoding means arranged in the at least one fluid duct so that the fluid duct is able to be brought into a predetermined angular position prior to contact being made between the at least one signal switch contact and the at least one signal conductor.

In the case of a fluid line of the type initially mentioned there is a provision such that a fluid line of the type initially mentioned has at least one fluid duct with at least one angular encoding means, into which the guide means of the connector is able to be introduced, the guide means being able to slide during such introduction along the at least one angular encoding means and that it possesses an end side provided for connection with the connector the at least one signal conductor terminating flush with at least one signal conductor or being set-back in relation to this at least one signal conductor.

In the case of a fluid power means of the type initially mentioned the object of the invention is to be attained by the provision of at least one such connector and/or at least one such fluid duct.

A principal concept of the invention is in this respect the provision of the angular encoding means on the inner side of the fluid line so that the outer side may possess an external shape optimized as regards fluid-tight or pressure-tight connection with the connector. It is however to be understood that in addition to the angular encoding means on the inner side in accordance with the invention the external shape of the fluid line may possess a angular encoding means. In any case, in the case of the connector of the invention the desired angular position necessary for contacting at least one signal conductor may be readily attained. Operation is simple, contact being reliably made with at least one signal conductor.

Further advantageous developments of the invention are defined in the claims.

It is preferred for the guide means to be so designed that on introduction of the fluid line the predetermined angular position may be already reached prior to locking the fluid line by the holding means. The fluid line may be rotated without any trouble into the angular position before the holding device impedes or even prevents rotation.

Preferably, the guide means is arranged in the plug socket. In this case a central arrangement is preferred.

Preferably the guide means is adapted for centering the fluid line in the plug socket, in which case however a centering means separate from the guide means is possible, for example in the form of a centering pin or the like.

It is an advantage for an abutment to be arranged in relation to the plug socket for the fluid line, in front of which the guide means project. The fluid line may then be slipped over the guide means and be moved forward as far as the abutment.

On the guide means at least one cam is preferably provided on the guide means for cooperation with the angular encoding means. The cam for example has the effect that the fluid line may be joined with the connector with a sort of turning and plugging movement, the cam acting so that during plugging the fluid line into position there is a superimposed rotary movement. However, a reversal of parts is possible such that the angular encoding means possesses at least one cam or is constituted by a cam.

In the case of the angular encoding means various different designs are possible: for example it may be constituted by the cross sectional configuration of the fluid duct, an elliptical or four cornered cross section being possible to set one or more angular positions. Furthermore, at least one groove and/or at least one projection may be provided as an angular encoding means. In such a projection preferably the at least one signal conductor is arranged. In any case the guide means is designed for cooperation with the correspondingly designed angular encoding means and for this purpose has lugs and pins and the like adapted for example to the configuration of the cross section, respectively, to the grooves and projections of the fluid duct.

In accordance with a particularly preferred design in accordance with the invention the guide means possesses at least two lugs adapted to match the shape of the fluid duct, which in the assembled state rest against the outline of the fluid duct. The lugs are preferably connected together by a stabilizing rib.

Dependent on the type, manner of functioning and number of the signal conductor or conductors the predetermined angular position may be a single angular position or a plurality of radially symmetrical angular positions may be provided. If only a single signal conductor is present, only a single angular position will be possible. If however for example two signal conductors are present, in the case of which reversal of electrical connections is of no concern, it is possible for example also for two angular positions which are radially symmetrical, to be set by the guide means in accordance with the invention.

A particularly reliable contact connection able to be constantly loaded is produced by the following preferred measure, which basically constitutes an invention in its own right in conjunction with a connector or a fluid power means of the type initially mentioned. In this case there is a provision such that at least one signal switch contact is able to be slid in the insertion direction of the fluid line and that the at least one signal switch contact is provided with spring means biased toward the opening for the insertion of the fluid duct so that when there is a longitudinal movement of the fluid duct on the connector the at least one signal switch contact will remain connected with the at least one signal conductor. Although the signal switch contact is able to be slid in the insertion direction, athwart the insertion direction the signal switch contact will remain essentially in a position which is relatively fixed in relation to the contacting signal conductor.

The at least one signal switching contact is preferably secured on a contact element bearing means in a manner providing a supporting action athwart the insertion direction, such contact element bearing means being mounted in a sliding fashion on the connector for motion in the insertion direction of the fluid duct. The guide means is best arranged on the contact element bearing means.

It is convenient for the at least one signal switch contact to be able to be at least frictionally locked on the fluid duct in relation to signal conductor. This means that the action of the spring means is advantageously enhanced.

The at least one signal conductor is best arranged in a signal conductor channel in the fluid line. The at least one signal switch contact is best so designed that it may enter into a section of the signal conductor channel from the end of the fluid duct. Here it is held by friction and more particularly with a clamping action. For entering the signal conductor channel the signal switch contact preferably has a point. The signal conductor channel is for example arranged in the interior of a projection extending into the fluid duct.

The at least one signal switch contact is preferably provided with an abutment acting against the insertion direction and against which the at least one signal switch contact may bear on insertion of the fluid line into the plug socket. This measure has a particularly effective in combination with the above mentioned measures: the signal switch contact may bear against the abutment during insertion of the fluid line so that the signal switch contact may penetrate a section of the signal conductor channel. The abutment may additionally protect or the signal switch contact or, respectively, the spring means against overloading.

It is convenient to provide a contact sealing means, which seals off the at least one signal switch contact in the mounted state from the at least one fluid duct. Dirt particles or other oxidizing and/or contaminating materials in the fluid or the pressure medium are then not able to impair the electrical contact between the signal conductor and the signal switch contact.

The spring means are preferably biased toward the insertion opening. Furthermore, they are preferably designed in the form of a connection line leading to the at least one signal switch contact. However, it is also possible for the spring means to comprise a spring means separate from the at least one signal switch contact.

The guide means preferably projects beyond the at least one signal switch contact. This means that there is the following course of events on attaching the fluid line to the connector: the guide means is introduced into the fluid duct and thus the predetermined angular position of the fluid line in relation to the connector is reached. It is only in this angular position the at least one signal switch contact comes into contact with the at least one signal conductor. It may then for example enter a signal conductor channel in the fluid line during longitudinal movement in the insertion direction.

In the case of the fluid line the following measures are preferably adopted:

Its end is preferably substantially flat. The flat end is for example constituted by cutting the fluid line.

The wall of the fluid line is preferably designed for an optimum pressure sealing action in the connection zone. For instance, in accordance with a preferred form of the invention its external surface keeps to a close tolerance. It will be clear that the fluid line is preferably precision finished externally along its entire length so that it may be severe, for example, using a knife, to a given length at any desired point and may be joined to the connector of the invention.

Furthermore the fluid line is such that at least in its part intended for connecting with the connector it has a smooth outline without projections or grooves. The outline is preferably exclusively or substantially convex, and curved outward, although outwardly non-curved, flat sections are possible.

The fluid line may be in the form of a flexible hose line and/or in the form of a rigid tube.

The angular encoding means is preferably arranged on the inner side of the fluid line. It can also be constituted by the wall.

The wall of the fluid line is preferably made essentially of plastic.

In the case of the at least one signal connector it may be a question of an conductor which is substantially incompressible in the length direction of the fluid line, for example in the form of a fiber-glass arrangement or a metal wire. Preferably however the at least one signal conductor is able to be compressed in the length direction of the fluid line. More particularly under the action of the at least one signal switch contact it is possible for the signal conductor to be forced, as it were, into the wall or displaced into this position during insertion of the fluid line into the connector.

Preferably the connector constitutes an integral component of the fluid power means. It is convenient for the connector to be at least partly constituted by a housing of the fluid power means, the plug socket being arranged in the housing of the fluid power means or being constituted by it.

Further advantageous developments and convenient forms of the invention will be understood from the following detailed descriptive disclosure of some embodiments thereof in conjunction with the accompanying drawings.

LIST OF THE SEVERAL VIEWS OF THE FIGURES

FIG. 2 shows a fluid power arrangement in the case of which a connecting technique in accordance with the invention is employed.

FIG. 3d shows a simplified design of the connector in accordance with FIGS. 3a through 3c.

FIGS. 4a to 4d show cross sectional view of the fluid lines in accordance with the invention, in whose fluid-channels a guide means in accordance with the invention is respectively introduced.

FIG. 5 shows a connector in a modified design.

DETAILED DESCRIPTION OF PREFERRED EMBODIMENTS OF THE INVENTION

Figure 1:
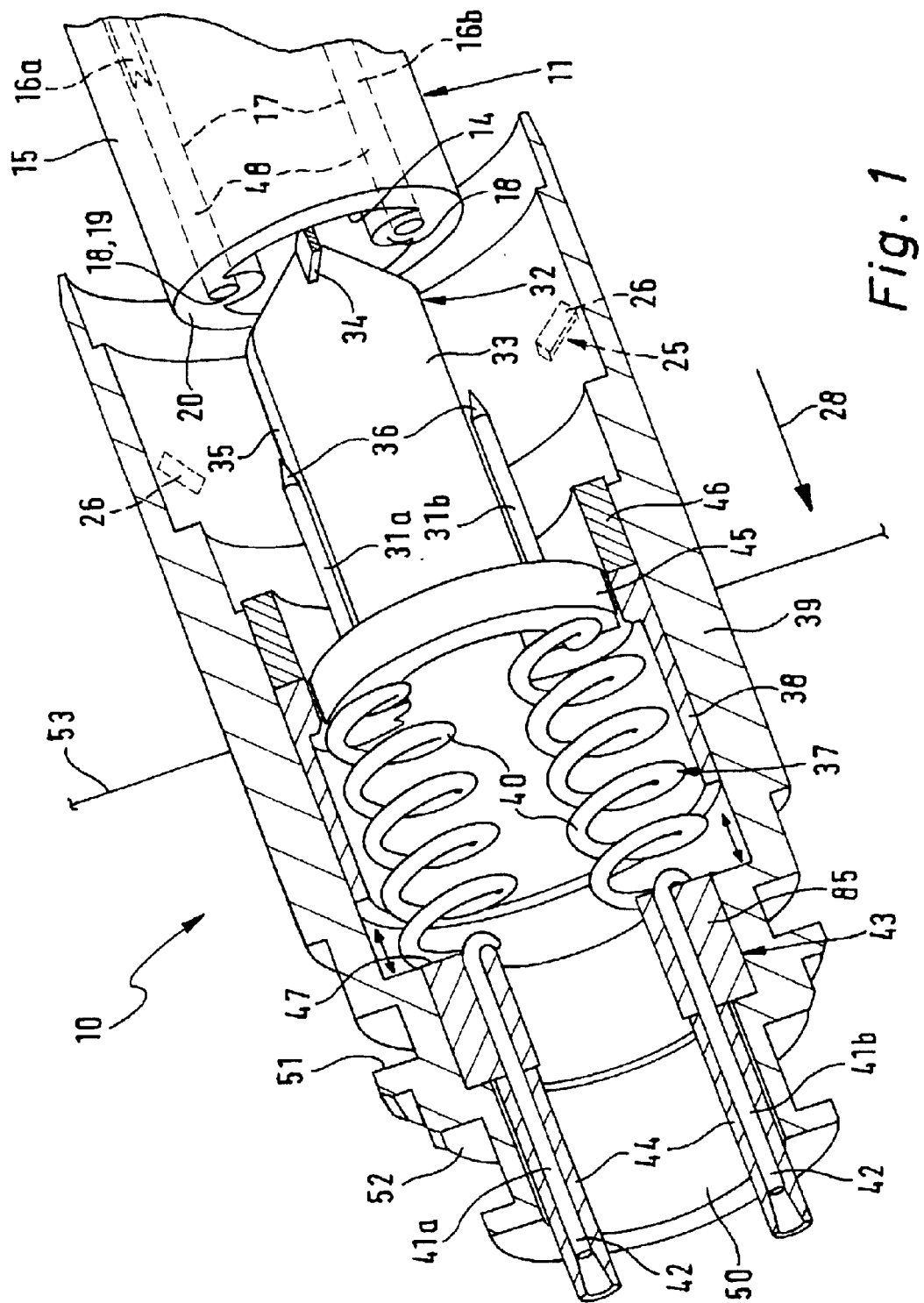
FIG. 1 shows partly in section a connector in accordance with the invention and a fluid line in accordance with the invention during the insertion operation, some components being omitted.

In the fluid power arrangement 12 valve arrangements 60 of a valve unit 61 are connected by way of fluid lines 11 with fluid power means 62. In the case of the means 62 it is a question of pneumatic power cylinders, as for example in the form of pneumatic linear drives or the like. The valve arrangements 60 in the present case comprise pneumatic pilot valves, which are operated electrically and/or electromagnetically. In accordance with the pilot action owing to the valve arrangement 60 it is possible for the power cylinders 62 to be supplied with compressed air or compressed air may leave the power cylinders, the respective pistons thereof being moved.

The valve unit 61 is supplied with compressed air by way of a compressed air supply line 66. The valve arrangements 60 are controlled and monitored by a local controller 65 of the valve unit 61. A central controller 63 controls and monitors the valve unit 61 by way of a control and monitoring line 64, which for instance is provided in a bus.

The power cylinders 62 are connected by way of fluid lines 11 with the valve unit 61. The fluid lines 11 are designed for the combined transfer of fluid, in the present case compressed air, and electrical and/or optical signals along a single connection line. In the case of the signals it is a question for example of electrical or optical signals, using which sensors 30, for example position sensors, condition information may be transmitted to the valve unit 61 or using which electrically or, respectively, optically controlled actuators for fluid power means (not illustrated in the figure) may be controlled.

The fluid lines 11 are in the present case in the form of flexible hose line. They are for example extruded plastic lines, whose wall 15 surrounds at least one fluid channel 14, which extends in the interior of the respective fluid line 11. In the present case the wall 15 has on the outside an exactly circular periphery and internally an essentially circular inner periphery defining the cross section of the fluid line 11. In the wall 15 signal conductors 16a and 16b are arranged, which in the present case consist of electrically conductive material, as for example of copper stranded wire or copper wire. At those position, where the signal conductors 16a and 16b are arranged in the wall 15 the wall has a thicker cross section. This thicker cross section in the present case has more particularly rib-like projections 18 extending along the full length of the fluid line 11, such projections 18 fitting into the wall 15 at the fluid channel 14, a signal conductor channel 17 being respectively arranged for a signal conductor 16a and 16b. In the case of the fluid line 11 the design of the inner face of the wall 15 and more particularly the radially symmetrical arrangement of the projections 18 constitutes an angular encoding means 19 in order to ensure a correct angular positioning of the fluid line 11 in the connectors 9 and 10 of the valve unit 61 and, respectively, of the power cylinders 62.

With reference to the connector 10 and the fluid line 11 in the following the connection technology will be explained, which is improved by the invention. The fluid line 11 is able to be cut to the desired length at any desired point. The signal conductors 16a and 16b do then not project past an essentially flat or planar face 20, which is formed for example but cutting the fluid line 11 to the desired length, and are in fact flush with it or are even retracted somewhat behind it, this however impeding the production of a reliable contact connection with the connector 10. Nevertheless, the fluid line 11 may in a simple manner be fitted to the connector and is then reliably and permanently joined to it.

The fitting of the fluid line 11 to the connector 10 is performed as follows: The fluid line 11 is inserted through an insertion opening 21 into a front section 22 of a plug socket 23. The front section 22 is constituted by a release ring 24 opening like a funnel-like manner toward the insertion opening 21, such ring serving as a release means for release of a holding device 25.

The holding means 25 comprises elastically flexible teeth or claws extending into the plug socket 23 and which are inclined in relation to the longitudinal axis of the plug socket 23 and are pivoted on a holding ring 27 so that on insertion of the fluid line 11 into the plug socket 23 they may be displaced radially outward. On retracting the fluid line 11 from the plug socket 23 or releasing it from some other force acting on the fluid line 11 against the direction 28 of insertion the teeth 26 bite into the fluid line 11 and accordingly hold same fast.

However, even before the holding action of the holding device 25 comes into play, the fluid line 11 is moved by a guide means 32 into a predetermined angular position on insertion of the plug socket 23, at which angular position the signal switch contacts 31a and 31b of the connector 11 may produce electrical connections with the signal conductors 16a and 16b.

The guide means 32 projects past the signal switch contacts 31a and 31b toward the insertion opening 21. The guide means 32 is able to be introduced into the fluid duct 14 and in the course of such introduction slides along the angular encoding means 19 constituted by the form of the fluid duct 14 and, respectively, the projections 18 to move the signal switch contacts 31a and 31b into a suitable angular position in relation to the signal conductors 16a and 16b.

The guide means comprises mutually opposite lugs 33, which taper toward the opening 21, in the present case to a point. In their front part the lugs 33 are joined together by a transverse rib 34. It is only in the rare case when the lugs 33 exactly hit the projections 18 on introduction of the fluid line 11 that it is necessary for the fluid line 11 to be turned to a slight extent intentionally. Otherwise—and this is by far and away the commonest case owing to the geometry of the shape of the fluid duct 14—the cams 35, which in the present case are constituted by the lateral sides of the front part, which runs to a point, of the lugs 33, have the effect that the fluid line 11 and/or the connector 10 are so turned on insertion in the insertion direction 28 that the predetermined angular position is reached. When this happens the cams 35 slide along the projections 18 acting as the angular encoding means 19. The fluid line 11 will in any case reach this angular position automatically and of its own accord.

The guide means 32 serves furthermore for centering the fluid line 11 in the plug socket 23. The lugs 33 are for this purpose adapted to the outline of the fluid duct 14 and in the specific case in hand are curved athwart the insertion direction 28 and in relation to the outer periphery of the connector 10. During further insertion of the fluid line 11 into the plug socket 23 the fluid line 11 will slide past the holding device 25 while pushing the teeth 26 out of the way. The fluid line 11 is then clamped as it were between the holding device 25 unit guide means 32 so that it is only able to move farther in the insertion direction 28. Once held in a preliminary manner, on further insertion the fluid line arrives at the signal switch contacts 31a and 31b, such contacts being in the present case in the form of metal pins.

The signal switch contacts 31a and 31b have points 36 directed toward the insertion opening 21, and in the course of further insertion of the fluid line 11 they enter the signal conductor channels 17 and accordingly produce electrical connections with the signal conductors 16a and 16b. In the case of the connector 10 the signal switch contacts 31a and 31b are arranged so that they may slide in the insertion direction 28 and are provided with spring means 37 so that the signal switch contacts 31a and 31b will remain connected with the respective signal conductors 16a and 16b even in the case of any longitudinal motion of the fluid line 11 on the connector 10. Such longitudinal movements take place for example following pressure surges or other changes in pressure in the fluid line 11.

In the present case the signal switch contacts 31a and 31b are secured to a contact element bearing means 38, that is mounted for sliding movement in the insertion direction 28 on the housing 39 of the connector 10. The contact element bearing means 38 has in the present case the form of a sleeve, whose outer periphery rests against the housing 39 and in whose interior the spring means 37 extend. The spring means 37 are constituted by sections 40, which are helically twisted, of supply leads 41a and 41b, which lead to the signal switch contacts 31a and 31b. The leads 41a and 41b are in the present case constituted by rear sections of the signal switch contacts 31a and 31b.

The ends 42, which are opposite to the signal switch contacts 31a and 31b, of the supply leads 41a and 41b extend out of the connector 10 and are for example connected with leads 29, which run from the connector 10 to the sensor 30. The leads 41a and 41b are electrically and mechanically separated from the surroundings by an insulating element 43. A sleeve-like body 85 of the insulating element 43 is arranged in the housing 39, the leads 41a and 41b being arranged in the wall of the body 85. The sections 44, which in the present case are flexible, of the insulating element 43 project in front of the housing 39, and the ends 42 of the leads 41a and 41b are arranged in the sections 44. The sections 44 are able to be slid toward the housing and/or drawn back from it and have funnel-like openings able to accept the electrical contact elements for making electrical contact with the ends 42. The section 44 are elastic and may form a sort of bead or overlapping structure over a contact area, for example on a printed circuit board, on which the ends 42 are for example seated.

Facing the insertion opening 21 a sealing ring 45 is arranged on the contact element bearing means 38, such ring 45 having the signal switch contacts 31a and 31b extending through it to hold same. In the present case the sealing ring 45 serves to secure the signal switch contacts 31a and 31b on the contact element bearing means 38. The signal switch contacts 31a and 31b may however also be directly secured on the contact element bearing means 38.

The spring means sections 40 each have their one end bearing against the contact element bearing means 38 and/or against the sealing ring 45 while the other end bears against the housing 39, that is to say in the present case on the insulating element 43. The spring means 37 are biased against the insertion direction 28, the contact element bearing means 38 bearing on a support ring 46 or some other abutment in a direction opposite to the insertion direction 28.

In the present case the guide means 32 is arranged on the contact element bearing means 38 and projects to the front thereof toward the insertion opening 21 If now on insertion of the fluid line 11 into the connector 10—one could in the present case speak of "slipping the fluid line 11 over the guide means 32"—the signal switch contacts 31a and 31b strike the end face 20 of the fluid line 11 or, respectively, the signal conductors 16a and 16b, the fluid line 11 will sort of slide the signal switch contacts 31a and 31b in the insertion direction 28 in relation to the housing 39 to the rear. When this happens, the contact element bearing means 38 will be bodily displaced to the rear and the spring means 37 will be stressed until the contact element bearing means 38 hits an abutment 47, which is constituted by a step on the housing 39 and/or the body 85 of the insulating element 43. The signal switch contacts 31a and 31b may then not be slid any farther in the insertion direction 28 and on further insertion of the fluid line 11 move farther into the connector 10 in the sections 48 of the conductor channels 17 until the fluid line 11 strikes the sealing ring 45, which constitutes an abutment associated with the plug socket 23. The sealing ring 45 then makes sealing contact with the end side 20 of the fluid line so that the signal switch contacts 31a and 31b are protected against fluid or other oxidizing and/or contaminating materials.

In the case of a longitudinal movement of the fluid line 11 in the connector 10 as well the sealing ring 45 reliably engages the end side 20 owing to the spring means 37. Furthermore—and this is a particularly important point—the signal switch contacts 31a and 31b essentially remain in the same position in relation to the fluid line 11 in the longitudinal direction. During a longitudinal movement of the fluid line 11 they are also moved resiliently and so reliably maintain the contact with the signal conductors 16a and 16b.

Although it would in principle be possible for the signal switch contacts 31a and 31b to be able to move in the longitudinal direction in the sections 48 of the signal conductor channels 17, in the present case however the signal switch contacts 31a and 31b have such a cross section and/or such a surface that in the sections 48 they are held by friction or even with a clamping action. The cross section of the signal switch contacts 31a and 31b is for example larger than that of the signal conductor channels 17. The surface is for example rough, ribbed, grooved or the like.

As for the electrical contact between the signal switch contacts 31a and 31b and the signal conductors 16a and 16b, there are various different possibilities. As an example the signal switch contacts 31a and 31b may partly or completely displace the signal conductors 16a and 16b from the sections 48, as is indicated in FIG. 1. It is however also possible for the signal switch contacts 31a and 31b to enter the signal conductor channels 17 adjacent to the signal conductors 16a and 16b and/or to cut into the the signal conductors 16a and 16b so that the latter in the sections 48 may assume positions at least partly adjacent to the signal switch contacts 31a and 31b. This design is particularly preferred, since it renders possible a good electrical connection.

Although the elongated shape of the signal switch contacts 31a and 31b and accordingly their entry into the signal conductor channels 17 is particularly preferred, it would in principle be possible to have contact faces lying flat against the sealing ring, 45 or contact faces which are curved toward the insertion opening 21, such faces preferably being faces on spring contact elements. Such contacts could provide a reliable connection with the signal conductors 16a and 16b even if the latter were flush with the end face 20.

Between the holding device 25 and the support ring 46 a fluid seal 86 in the form of an O ring is provided, which with a fluid line 11 inserted into the connector 10 makes contact with the outer side thereof and provides a fluid sealing action. Fluid from the fluid duct 11 may therefore flow past the contact element bearing means 38, in the present case through the same, to an connection opening 50 on the side opposite to the insertion opening 21, of the connector 10 and thence for example to a chamber of the power cylinder 62.

For the release of the fluid line 11 from the holding device 25 the release ring 24 is moved in the insertion direction 28 so that the teeth or claws 26 are moved clear of the outer periphery of the fluid line 11 and same may be drawn out of the connector 10.

The housing 39 of the connector 10 has external steps 51 and a seal 49 seated in the groove 52 constituted by the steps 51 so that for example it may be screwed or thrust into a housing 53 of the power cylinder 62.

Figure 3A:
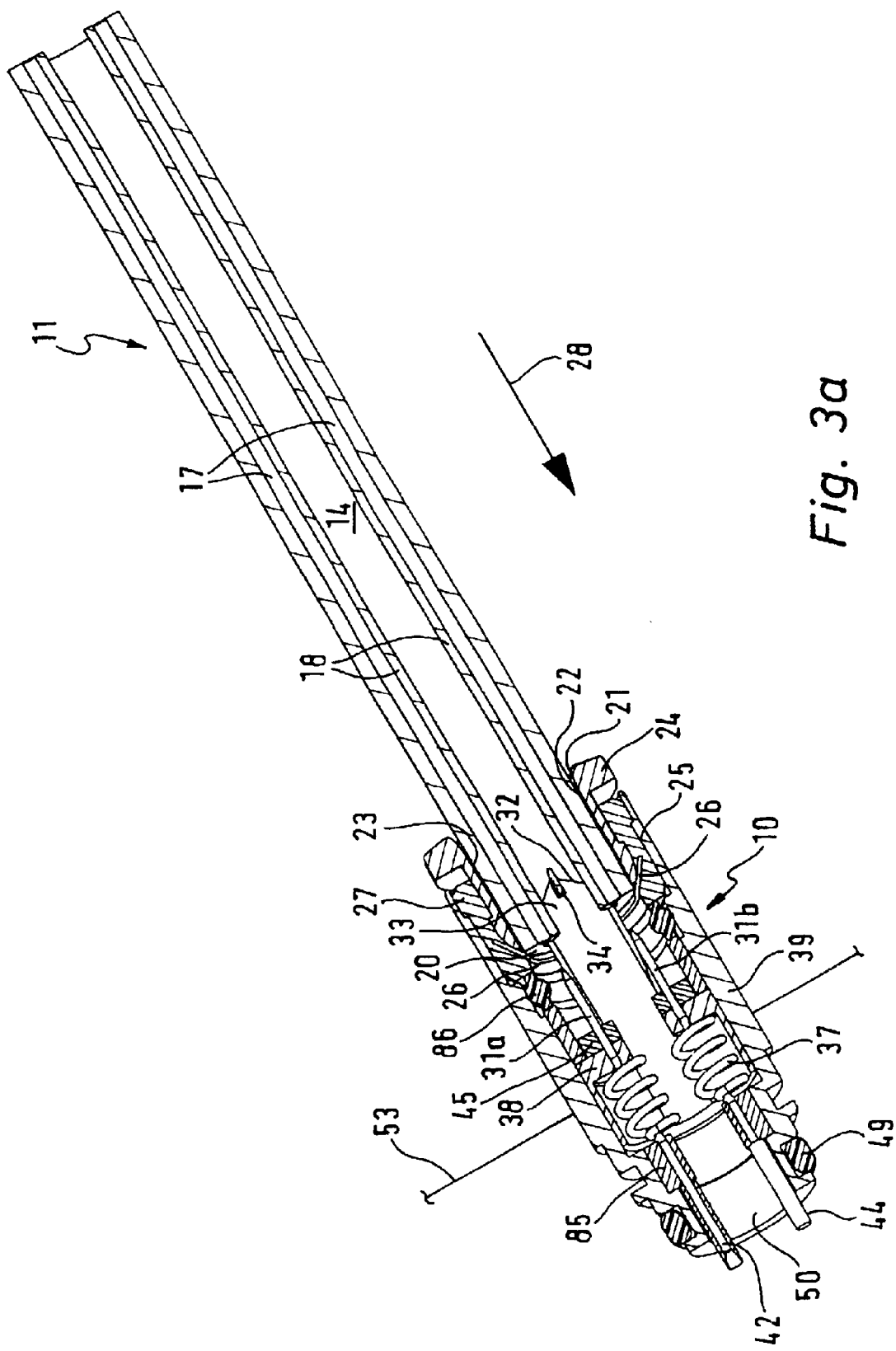
FIG. 3a shows a connector and a fluid line in accordance with FIG. 1 also in a cross sectional elevation during the insertion operation, without the omission of any components of the connector as in figure

However, the housing of a connector could in principle also be formed by a housing of a fluid power means, as for example by the housing 53. For instance, the connector 87 as shown in FIG. 3d, which unlike the connector 10 does not have any housing of its own, could be incorporated in a housing of a fluid power means.

In the present case the fluid line 11 has a strictly minimum external diameter tolerance, something rendering possible a high quality seal at the connector 10. A further contribution to a satisfactory seal is that the fluid line 11 has a circular outline. In this respect it is to be noted however that in principle other outlines would be possible, for instance a polygonal or elliptical one.

It is preferred for the fluid line 11 to possess an even cross section along its entire length so that it can be cut at any position and still fit the connector. Designs are however also possible in the case of which a fluid line has branches as illustrated in FIG. 2 for example. In this case the line itself may possess branches and/or, as in FIG. 2, for example T-unions 88 are present to form branches. The connectors 9 of the valve arrangements 60 may for example be designed to receive two particular fluid lines of the type 11 or for example to receive a fluid line 89 with for example two, of which one branches at the respective T-union 88 into a fluid duct of a fluid line 11.

The connector 13 depicted in FIG. 5 has in principle the same structure as the connector 10. Similar components are provided with the same reference numerals. The differences will be described in the following.

The holding device 25 and the release ring 24 constitute a subassembly 55, which is able to be inserted into the housing 39. A contact element bearing means 56 is arranged in this housing able to slide in the insertion direction 28, such bearing means essentially having the same function as the contact element bearing means 38: on it the signal switch contacts 31a and 31b are secured athwart the direction 28 of insertion 28 and furthermore the guide means 32 is fixed on it. Instead of the leads 41a and 41b the leads 57a and 57b are provided, which possess contact pins 58 projecting past the housing 39 and furthermore spring contacts 59 arranged between the contact pins 58 and the signal switch contacts 31a and 31b. The spring contacts 59 serve on the one hand for electrical signal transmission between the contacts 31a and 31b and the contact pins 58 and on the other hand as spring means 37 in accordance with the invention, which bias the contact element bearing means 56 toward the insertion opening 21.

A spring 67 is indicated in chained lines, which instead of or in addition to the spring contacts 59 could perform the function of spring means 37 in accordance with the invention. The contacts 37a and 37b and the contact pins 58 could be connected with flexible lines (not illustrated) instead of with the spring contacts 59.

Figure 3B:
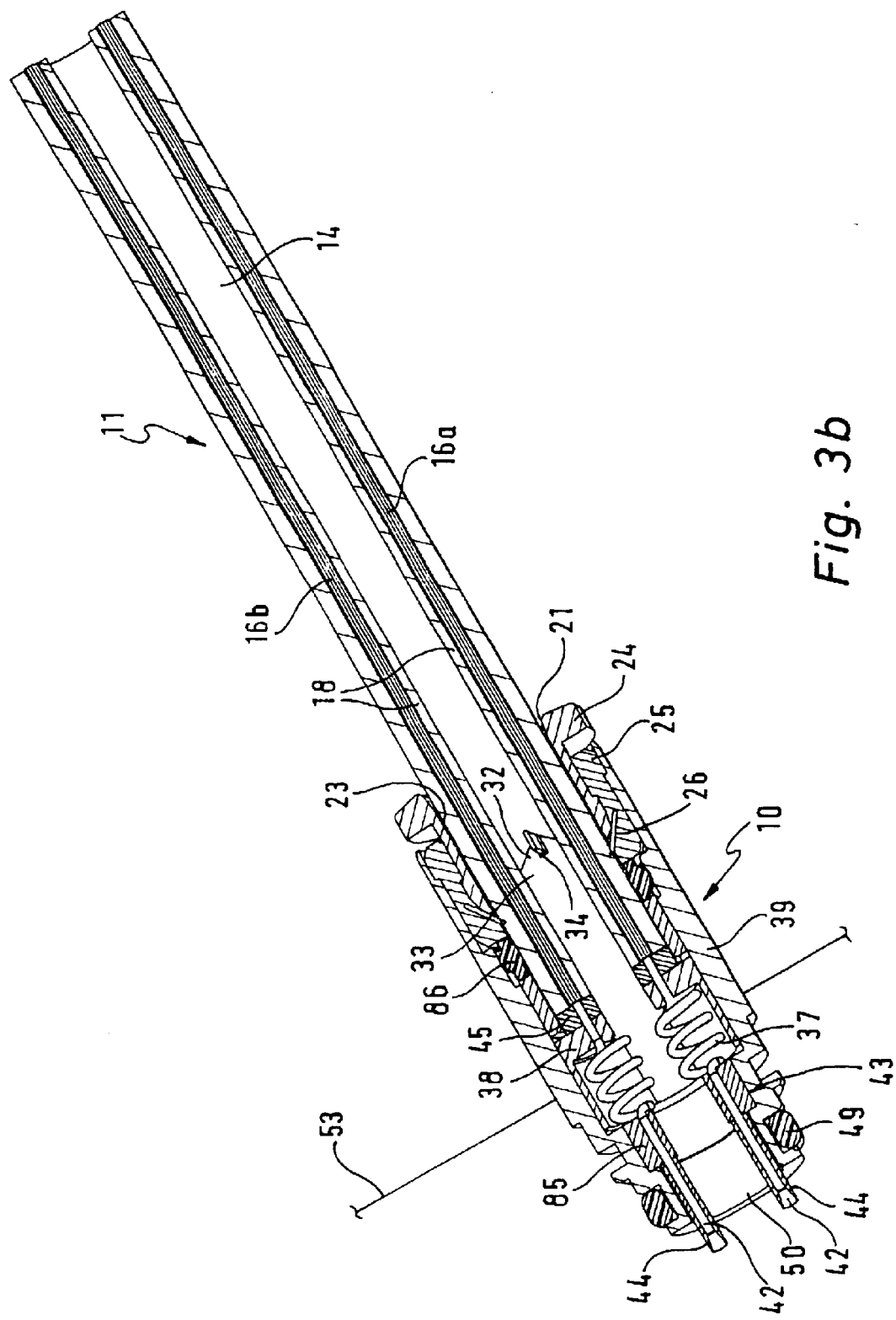
FIG. 3b shows the view as in FIG. 3a, the fluid line being completely inserted into the connector.
Figure 3C:
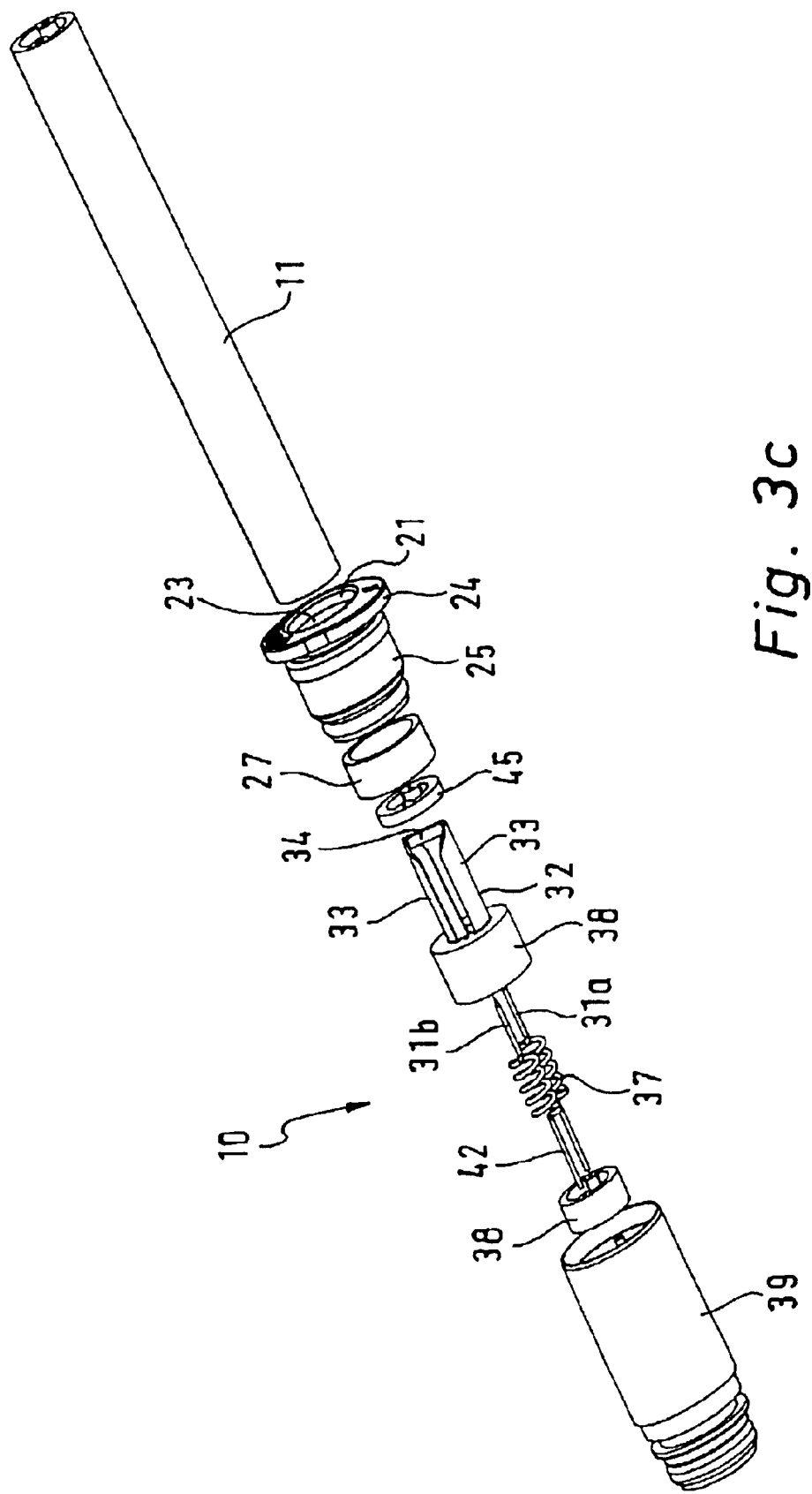
FIG. 3c is an exploded view of the connector and of the fluid line in accordance with FIGS. 1, 3a and 3b.

Various different forms of angular encoding means in accordance with the invention are to be seen in the case of the fluid lines 68 through 71 in FIGS. 4a through 4d. In the following components with equivalent functions are provided with reference numerals as in FIGS. 1 through 3.

The wall 15 of the fluid line 68 is externally circular but internally defines an fluid duct 72 tending to be elliptical. Moreover, on the bore face of the wall 15 mutually opposite grooves 73 are arranged, which constitute a angular encoding means. In the grooves 73 groove pieces 74 are arranged, which constitute a guide means of the invention. The groove pieces 74 are for example designed tapering to a point like the lugs 33 so that same may be readily introduced into the grooves 74. On introduction of the groove pieces 74 into the fluid duct 72 in principle two alternative angular positions of the fluid duct 68 in relation to the connector are possible, in the case of which the signal conductors 16a and 16b arranged in the wall 15 may come into contact with the signal switch contacts, associated with them, on the connector.

Four possible angular positions are possible in the case of the fluid line 69 in accordance with FIG. 4b, which has a circular outline and internally has a fluid duct 76 with an essentially square cross section, which constitutes a angular encoding means. On the lateral edges of this fluid duct 76 there rest, for example guide elements 77 in the form of guide rods, as part a guide means in accordance with the invention. In each case generally in the middle of the lateral faces of the fluid duct 76, that is to say where the wall 15 has a maximum thickness, signal conductors 75 are arranged.

The fluid line 70 in accordance with FIG. 4c has an elliptical outline and an essentially square cross section fluid duct 76 (into which the guide elements 77 are inserted) as in FIG. 4b. In the case of the fluid line 70 both its outline and also the square cross section of the fluid duct 76 constitute angular encoding means. In the case of the fluid line 70 four signal conductors 78 are provided, which are respectively arranged in pairs at opposite lateral faces of the fluid duct 76. Here as well the signal conductors 78 are placed where the wall 15 has its maximum thickness, as was the case with the fluid line 69.

In contradistinction to all examples so far in the case of the fluid line 71 only one single angular position is possible on connection with a suitable connector 79. Such a design will be selected for example when only one single signal conductor is present or when a plurality of signal conductors 80 are to be connected up without any chance of connection reversal. The connector 79 possesses a guide means 81 with a spur 83 and a lug 82 opposite to it. The spur 83 runs in a groove 84, constituting the angular encoding means, in the wall 15. The lug 82 rests against the opposite section, which is substantially circular, of the wall 15.

What is claimed is:

1. A connector for a fluid line delimiting a fluid duct therein, a wall of said fluid line having at least one signal conductor for the transmission of electrical and/or optical signals, said connector comprising a plug socket for receiving the fluid line, a holding device for holding the fluid line in a mounted condition, and at least one signal switch contact for producing a connection with the at least one signal conductor, wherein at the plug socket the connector includes a guide means for angularly aligned arrangement of the fluid line, the guide means being able to be introduced into the fluid duct such that the guide means slides along at least one angular encoding means arranged in the fluid duct so that the fluid duct is able to be brought into a predetermined angular position prior to contact being made between the at least one signal switch contact and the at least one signal conductor.

2. The connector as set forth in claim 1, wherein the guide means is so designed that on introduction of the fluid line the predetermined angular position is already reached before fixing the fluid line by means of the holding device.

3. The connector as set forth in claim 1, wherein the guide means is centrally located and made a part of the plug socket.

4. The connector as set forth in claim 1, wherein the guide means is designed to center the fluid line at the plug socket.

5. The connector as set forth in claim 1, further including an abutment at the plug socket for the fluid line, said guide means projecting to the front of said abutment.

6. The connector as set forth in claim 1, wherein the guide means comprises at least one cam for cooperation with the angular encoding means.

7. The connector as set forth in claim 1, wherein the angular encoding means is constituted by the cross sectional configuration of the fluid duct and/or by at least one projection in which the at least one signal conductor is arranged and wherein the guide means is designed for cooperation with the correspondingly designed angular encoding means.

8. The connector as set forth in claim 1, wherein the guide means comprises at least two lugs adapted to the outline of the fluid duct.

9. The connector as set forth in claim 1, wherein the predetermined angular position is a unique angular position or wherein the predetermined angular position is associated with a second radially symmetrically placed angular position.

10. The connector as set forth in claim 1, wherein the at least one signal switch contact is able to be slid in the insertion direction of the fluid line.

11. The connector as set forth in claim 1, wherein the at least signal switch contact is set on a contact element bearing means, which is able to be slid in the insertion direction of the fluid line.

12. The connector as set forth in claim 11, wherein the guide means is arranged on the contact element bearing means.

13. The connector as set forth in claim 1, wherein the at least one signal switch contact is able to be set on the fluid line in relation to the at least one signal conductor at least by friction.

14. The connector as set forth in claim 1, wherein the at least one signal conductor is arranged in a selected conductor channel of the fluid line and wherein the at least one signal switch contact is so designed that it may be introduced into a section of the signal conductor channel from the end thereof.

15. A fluid line for a connector as set forth in claim 1 defining a fluid line therein and comprising a wall which has at least one signal conductor for the transmission of electrical and/or optical signals, said fluid duct having at least one angular encoding means into which the guide means of the connector may be introduced, the guide means being able to slide during such introduction along the at least one angular encoding means, said fluid line having an end face, for connection with the connector, the at least one signal conductor terminating flush with such end face or said at least one signal conductor being set back in relation to it.

16. A fluid line as set forth in claim 15 wherein the end face is essentially planar and is defined by cutting off a length of the fluid line at an arbitrarily selected point.

17. A fluid line as set forth in claim 15 wherein the wall of the fluid line has an outer diameter with a precision tolerance.

18. A fluid line as set forth in claim 15 wherein at least in its connection part provided for the connector it possesses an even outline free of projections or grooves.

19. A fluid power means comprising at least one connector as set forth in claim 1 and/or comprising at least one fluid line as set forth in claim 15.

20. The fluid power means as set forth in claim 19 wherein the at least one connector constitutes an integral component of the fluid power means and more particularly is constituted by a housing of the fluid power means.

21. A connector for a fluid line delimiting a fluid duct therein, a wall of said fluid line having at least one signal conductor for the transmission of electrical and/or optical signals, said connector comprising a plug socket for the fluid line, a holding device for holding the fluid line in a mounted condition, and at least one signal switch contact for producing a connection with the at least one signal conductor, wherein at the plug socket the connector includes a guide means for angularly aligned arrangement of the fluid line, the guide means being able to be introduced into the fluid duct such that the guide means slides along at least one angular encoding means arranged in the fluid duct so that the fluid duct is able to be brought into a predetermined angular position prior to contact being made between the at least one signal switch contact and the at least one signal conductor, the guide means includes at least two lugs adapted to the outline of the fluid duct, which in the mounted state rest against the outline of the fluid duct and are connected with one another by a stabilizing rib.

22. A connector for a fluid line delimiting a fluid duct therein, a wall of said fluid line having at least one signal conductor for the transmission of electrical and/or optical signals, said connector comprising a plug socket for the fluid line, a holding device for holding the fluid line in a mounted condition, and at least one signal switch contact for producing a connection with the at least one signal conductor, wherein at the plug socket the connector includes a guide means for angularly aligned arrangement of the fluid line, the guide means being able to be introduced into the fluid duct such that the guide means slides along at least one angular encoding means arranged in the fluid duct so that the fluid duct is able to be brought into a predetermined angular position prior to contact being made between the at least one signal switch contact and the at least one signal conductor, the at least one signal switch contact is able to be slid in the insertion direction of the fluid line and wherein the at least one signal switch contact is associated with spring means for the fluid line acting toward an insertion opening so that in the course of a longitudinal movement of the fluid line mounted on the connector the at least one signal switch contact remains connected with the at least one signal conductor.

23. A connector for a fluid line delimiting a fluid duct therein, a wall of said fluid line having at least one signal conductor for the transmission of signals, said connector comprising:

a plug socket;

a holding device for holding the fluid line in a mounted condition;

at least one signal switch contact connectable with the at least one signal conductor;

a guide means disposed in the plug socket for angularly aligned arrangement of the fluid line, the guide means adapted to be introduced into the fluid duct such that the guide means slides along an angular encoding means arranged in the at least one fluid duct, the angular encoding means permitting the fluid duct to be brought into a predetermined angular position prior to contact being made between the at least one signal switch contact and the at least one signal conductor, wherein the angular encoding means in cooperation with the guide means limits angular rotation of the connector relative to the fluid line while permitting axial movement there between.

24. A connector for a fluid line having a fluid duct therein, a wall of the fluid line having at least one signal conductor for the transmission of electrical and/or optical signals, said connector comprising:

a housing;

a plug socket formed within the housing and adapted to receive the fluid line;

a holding device for holding the fluid line in a mounted condition;

at least one signal switch contact connectable with the at least one signal conductor, the at least one signal switch contact being disposed on a contact element bearing member which is slideable relative to the housing in an axial direction;

a guide means disposed in the plug socket for angularly aligned arrangement of the fluid line, the guide means being able to be introduced into the fluid duct such that the guide means slides along an angular encoding means arranged in the at least one fluid duct, the angular encoding means permitting the fluid duct to be brought into a predetermined angular position prior to contact being made between the at least one signal switch contact and the at least one signal conductor.

25. A connector for a fluid line having a fluid duct therein, a wall of the fluid line having at least one signal conductor for the transmission of electrical and/or optical signals, said connector comprising:

a plug socket formed within the housing and adapted to receive the fluid line;

a holding device for holding the fluid line in a mounted condition;

at least one signal switch contact connectable with the at least one signal conductor;

a guide means disposed in the plug socket for angularly aligned arrangement of the fluid line, the guide means being able to be introduced into the fluid duct such that the guide means axially slides along an angular encoding means arranged in the at least one fluid duct without need for rotation of the guide relative to the connector, the angular encoding means permitting the fluid duct to be brought into a predetermined angular position prior to contact being made between the at least one signal switch contact and the at least one signal conductor.

26. A connector for a fluid line having a fluid duct therein, a wall of the fluid line having a signal conductor for the transmission of a signal, said connector comprising:

a plug socket formed within the housing and adapted to receive the fluid line;

a holding device for holding the fluid line in a mounted condition;

a signal switch contact connectable with the at least one signal conductor, a guide means disposed in the plug socket and connected to the signal switch contact, the guide means having a surface adapted to engage an angular encoding means disposed on the fluid line such that the guide means aligns and maintains the signal switch contact in a predetermined angular position wherein the signal contact switch is aligned with the signal conductor, when the fluid line is inserted into the plug socket.

* * * * *

UNITED STATES PATENT AND TRADEMARK OFFICE
CERTIFICATE OF CORRECTION

PATENT NO.    : 6,783,379 B2
DATED         : October 4, 2004
INVENTOR(S)   : Kerscher et al.

It is certified that error appears in the above-identified patent and that said Letters Patent is hereby corrected as shown below:

<u>Column 5,</u>
Line 19, now reads "as in figure…" and should read -- as in Fig. 1… --.

Signed and Sealed this

First Day of March, 2005

JON W. DUDAS
*Director of the United States Patent and Trademark Office*